(12) United States Patent
Blendinger et al.

(10) Patent No.: US 7,878,058 B2
(45) Date of Patent: Feb. 1, 2011

(54) FLUID MONITORING APPARATUS AND METHOD

(75) Inventors: Lawrence Blendinger, Wall, NJ (US); Robert M. Ryan, Bay Head, NJ (US)

(73) Assignee: Walker Engineering Inc., Point Pleasant, NJ (US)

( * ) Notice: Subject to any disclaimer, the term of this patent is extended or adjusted under 35 U.S.C. 154(b) by 195 days.

(21) Appl. No.: 11/940,610

(22) Filed: Nov. 15, 2007

(65) Prior Publication Data
US 2009/0126483 A1    May 21, 2009

(51) Int. Cl.
*G01F 23/26* (2006.01)
(52) U.S. Cl. .................................... 73/304 C
(58) Field of Classification Search ............... 73/290 R, 73/292; 324/323
See application file for complete search history.

(56) References Cited

U.S. PATENT DOCUMENTS

| | | | |
|---|---|---|---|
| 3,974,695 A * | 8/1976 | Lerner ..................... | 73/304 C |
| 5,507,178 A | 4/1996 | Dam | |
| 5,722,290 A | 3/1998 | Kronberg | |
| 6,157,894 A * | 12/2000 | Hess et al. ................ | 73/290 R |
| 6,928,862 B1 * | 8/2005 | Robbins ................... | 73/64.55 |
| 7,134,330 B2 | 11/2006 | Wernet et al. | |
| 2007/0251316 A1 * | 11/2007 | Mahadevaiah ........... | 73/290 R |

* cited by examiner

*Primary Examiner*—Hezron Williams
*Assistant Examiner*—Alex Devito

(57) ABSTRACT

A fluid monitoring apparatus and method is disclosed for use in an underground utility vault. Specifically, a system utilizing multiple sensors to determine the total amount and type of fluid present in a utility vault is disclosed. A first sensor located above the fluid detects and determines the overall depth of fluid present. A second sensor, relying on specific properties of the fluid(s) present, is located in contact with the fluids present. The information regarding specific fluid level and type is conveyed to a central location for monitoring.

8 Claims, 5 Drawing Sheets

FLUID MONITORING APPARATUS AND METHOD

FIELD OF THE INVENTION

This invention relates to a system for measuring and detecting the presence of one or more fluids in an enclosed space and for transmitting that information. More specifically, the invention is directed to a system and apparatus for measuring the presence of water and dielectric fluid inside an enclosure such as a utility vault and transmitting that information to a remote location.

BACKGROUND OF THE INVENTION

Underground electrical distribution systems, such as those located in urban areas and under streets utilize underground utility vaults or enclosures to install utility components, such as transformers, wires, conduits etc. Exposure of these components to the elements, such as water are a constant threat and concern to providers. Additionally, the presence of certain fluids in utility vaults may indicate problems or potential problems requiring immediate attention. The traditional method of detecting and monitoring fluid in underground utility vaults involves sending a work crew for an in-person inspection of the contents of each enclosure. This method is both time and labor intensive and extremely costly.

There presently exist liquid detection sensors that have the ability to detect the presence of specific fluids in an enclosed area, such as the sensor head disclosed in U.S. Pat. No. 5,507,178. However, such sensors are intended to merely detect the presence of certain fluids in enclosed spaces, such as ship hulls, and do not measure the depth of the fluid nor do they have the ability to transmit that information. It is therefore desirable to have a sensor and system that can detect the presence of fluid in an enclosure, can measure the amount and type of fluid present within the enclosure and that can transmit that information to a central location so that a provider may respond to problems in a more timely and cost effective manner and without having to waste resources by conducting in-person inspections of enclosures that do not require inspection.

BRIEF SUMMARY OF THE INVENTION

One aspect of the invention is directed to a system for measuring the amount and type of at least one fluid present in an enclosed space.

Another aspect of the invention relates to an apparatus comprising a first sensor for detecting a total volume of fluid; and a second sensor to determine the volume presence of a first fluid or a second fluid. Where a property of the first fluid is different from a property of the second fluid; and where the first and second fluids make up at least a portion of the total volume of fluid.

Another aspect of the invention is directed to a sensor for determining the presence of fluid in an enclosed spaces as well as a characteristic of the fluid. In this aspect of the invention, the sensor head is comprised of a sensor body and sensor circuit. The sensor body is made from a material whose buoyancy allows it to float in the presence of water and sink in the presence of dielectric fluid. In one embodiment, the sensor circuit utilizes parallel plate capacitors as the frequency-determining element of an oscillator circuit. The sensor circuit allows the sensor to detect the presence and type of fluid based on the resonant frequency of oscillators in the presence of a fluid.

Another aspect of the invention relates to a utility vault or manhole monitoring systems comprising a first and second sensor, a processor, and a transmitter. The first sensor is located at or near the top of a manhole or utility vault and uses a sonar or similar device to determine the overall depth of fluid present in the enclosure. The second sensor is disposed in a "barge" that floats in the presence of water. In one embodiment, the barge utilizes a series of parallel plate capacitors with open spaces between the plates to determine the presence of dielectric fluid and/or water. The manhole monitoring system also includes data storing and data transmission of the information it collects about the type and amount of fluid present, with the ability to transmit that information to a central location on a periodic basis.

BRIEF DESCRIPTION OF THE DRAWINGS

For a better understanding of the present invention, reference is made to the following description and accompanying drawings, while the scope of the invention is set forth in the appended claims:

DETAILED DESCRIPTION OF THE INVENTION

I. System Overview

Figure 1:
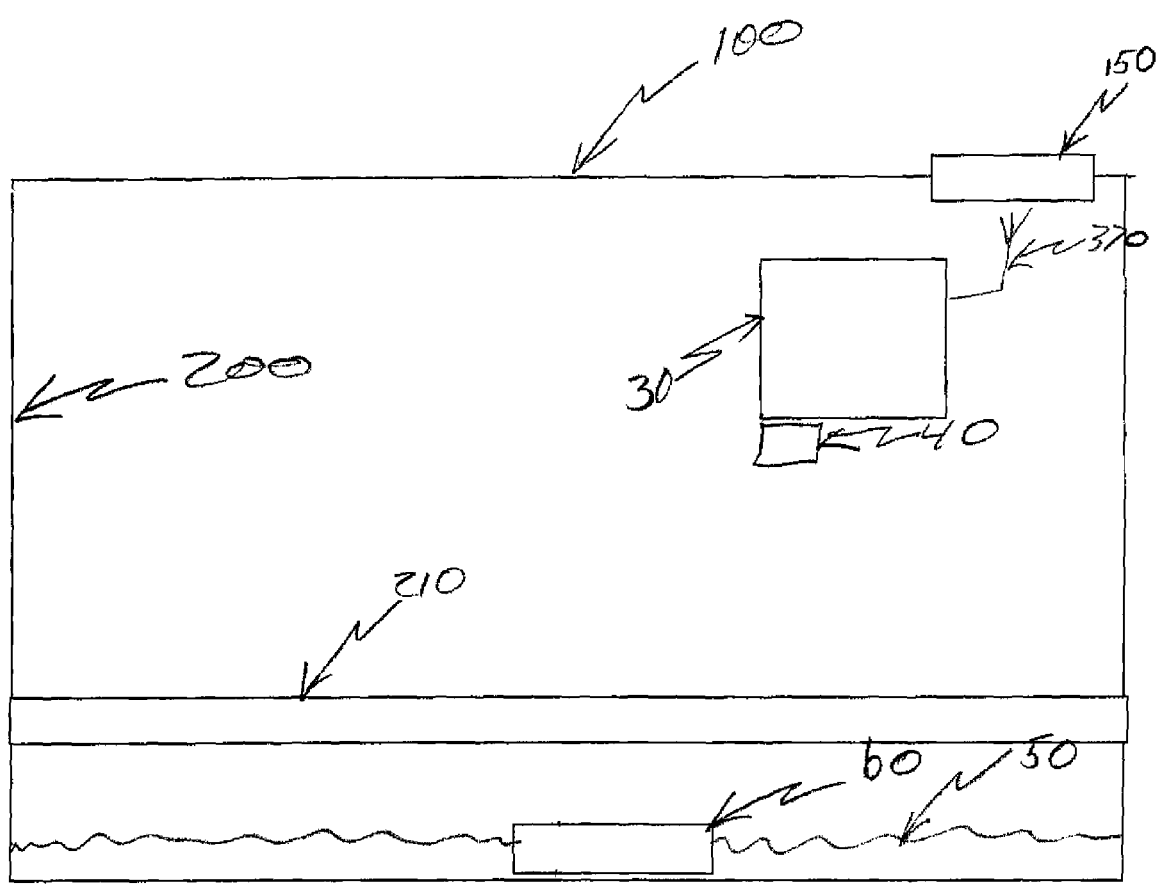
FIG. 1 shows a block diagram of an exemplary utility vault monitoring system in accordance with the invention.

The present invention concerns a system and method for monitoring fluids inside an enclosure. More specifically the present invention relates to a utility vault or utility vault monitoring system comprising an assembly mounted at or near the ceiling of the utility vault and a floating assembly or barge that floats in the presence of water. As used herein, the term utility vault refers to a room, typically underground, providing access to subterranean utility equipment, such as valves for water or natural gas pipes, or switchgear for electrical or telecommunications equipment. A utility vault is commonly constructed out of reinforced concrete, poured cement or brick. Small utility vaults are typically entered through a manhole or grate on the topside. Larger utility vaults are often similar to mechanical or electrical rooms in design and content.

Referring to the drawings, like numbers indicate like parts throughout the views as used in the description herein, the meaning of "a," "an," and "the" includes plural reference unless the context clearly dictates otherwise. Also, as used in the description herein, the meaning of "in" includes both "in" and "on" unless the context clearly dictates otherwise. Also, as used in the description herein, the meanings of "and" and "or" include both the conjunctive and disjunctive and may be used interchangeably unless the context clearly dictates otherwise.

FIG. 1 shows representative components of a utility vault monitoring system. Item 200 represents a utility vault installed below street level 100 with street access via manhole 150. Item 210 is an under ground conduit through which utility lines are run. Electronics assembly 30 is mounted to the side of the utility vault 200 and may house the necessary electronics to process and transmit the data to a central location. Sensor 40, is mounted to the utility vault at a location above conduit 210 and higher than the expected level of accumulated fluid 50 that might be in utility vault 200. A second sensor 60 is located in such a manner as to be in contact with any accumulated fluid 50.

Figure 2:
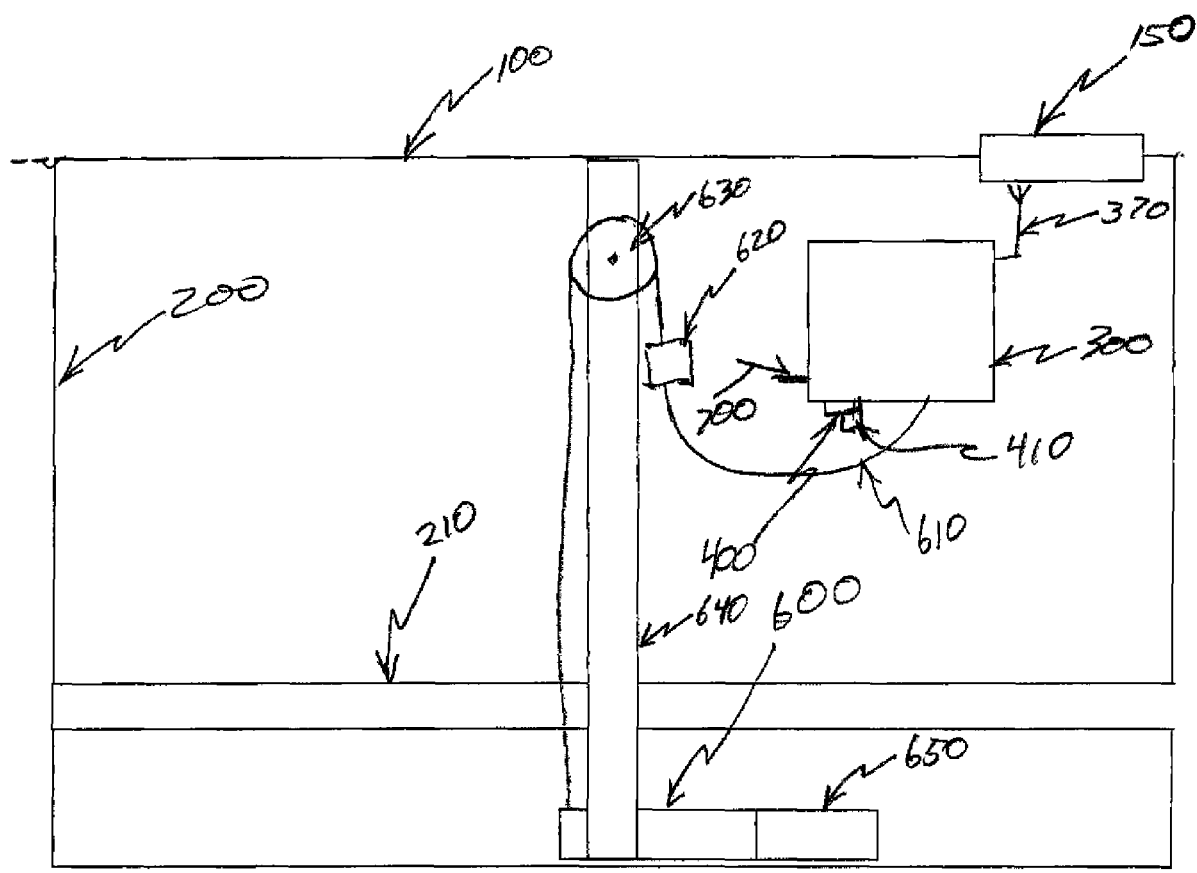
FIG. 2 shows a block diagram of an alternative embodiment of a utility vault monitoring system in accordance with the invention.

FIG. 2 shows a block diagram of an exemplary system in accordance with the invention. Item 200 represents an exemplary utility vault installed below street level 100. Item 210 is an under ground conduit through which utility lines extend. Housing assembly 300 is mounted near the top of enclosure 200 that contains a processor 310, batteries 320, a wireless transmitter 330, a circuit interface 340, and sensors 400, 500 and 700. Fixed assembly 300 is mounted to the utility vault above conduit 210 in a location that is higher than the level of water or fluid that might accumulate in utility vault 200.

Sensor barge 600 houses a barge sensor 650 to detect the presence of fluid in utility vault 200. Sensor barge 600 is located in proximity to sensor barge guide 640 in such a way as to allow sensor barge 600 to float freely upon water in utility vault 200. Sensor barge guide 640 is mounted between the top and bottom of utility vault 200. Sensor barge 600 is connected to the fixed assembly 300 via sensor umbilical cable 610. Sensor umbilical cable 610 is connected to the circuit interface 340 located in fixed assembly 300. Sensor umbilical cable 610 exits fixed assembly 300 and runs over pulley 630 down to sensor barge 600. Pulley 630 is mounted to sensor barge guide 640 at a height approximately equal to or higher than fixed assembly 300. Sensor umbilical cable weight 620 is located to provide constant downward force on sensor umbilical cable 610. The constant downward force on sensor umbilical cable 610 keeps sensor umbilical cable 610 taught as sensor barge 600 rises up and down on the accumulated fluid.

As will be appreciated by those skilled in the art, alternative configurations, such as a wireless data transmission or other configurations may be employed to connect the sensor barge 600 to circuit interface 340 without departing from the spirit of the invention.

Figure 3:
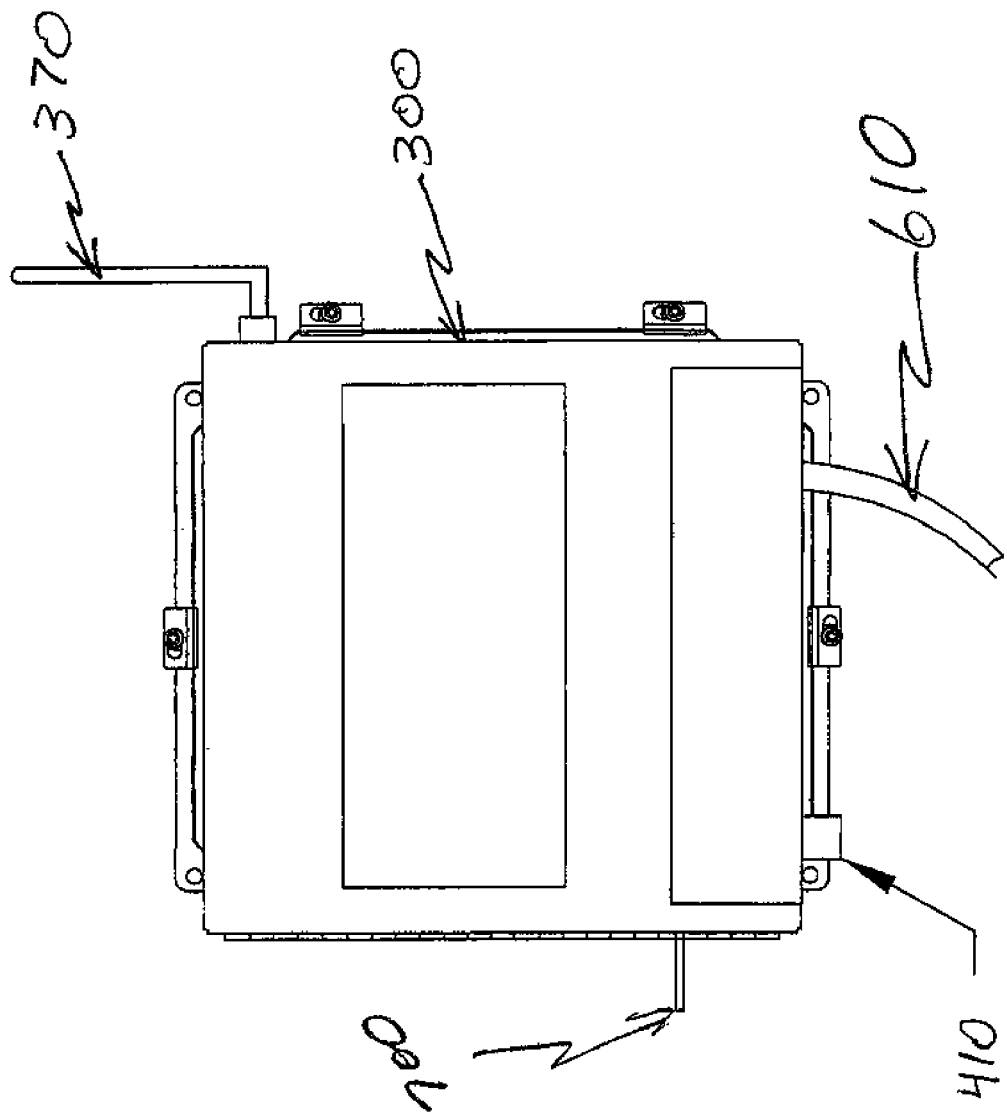
FIG. 3 shows an exemplary external housing of a fixed assembly in accordance with the invention.
Figure 4:
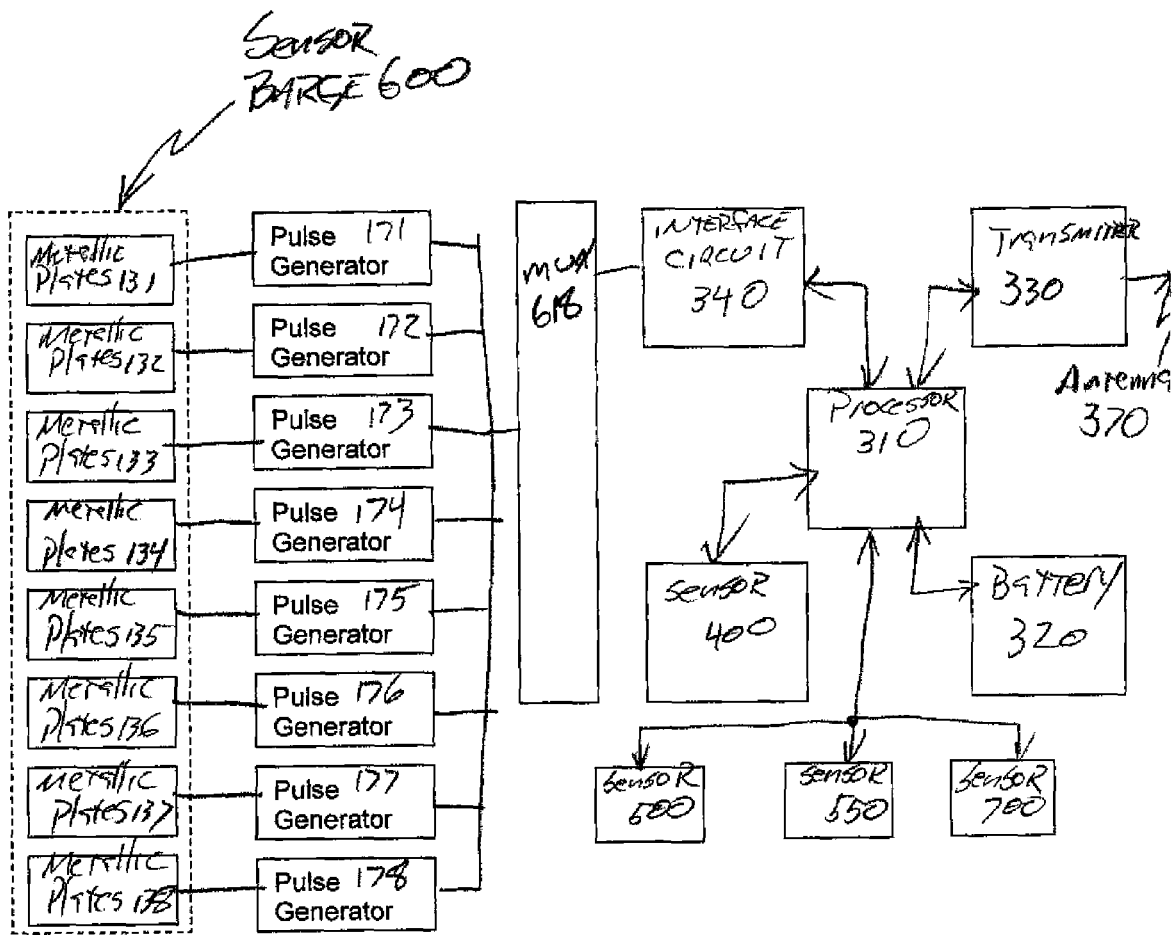
FIG. 4 shows a exemplary schematic for use in a utility vault monitoring system in accordance with the invention.

Referring to FIG. 3, assembly 300 is a watertight enclosure large enough to house the required electrical components. An example of a suitable housing would be a National Electrical Manufacturers Association 4X fiberglass enclosure, although any enclosure of suitable size will be sufficient. FIG. 4 depicts an exemplary circuit for use in the assembly 300. In FIG. 4, assembly 300 may include, for example, a processor 310, a battery or series of batteries 320, a cellular or wireless transmitter 330, and interface circuitry 340. Wireless transmitter 330 is connected to antenna 370 that is mounted to the external portion of fixed assembly 300. Although FIGS. 3 and 4 depict a single housing for processor 310, batteries 320, wireless transmitter 330 and interface circuitry 340 within an enclosed watertight assembly, it is readily understood that different housing configurations are usable in accordance with the invention, including omitting the housing itself.

Once again, referring to FIG. 3, assembly 300 may further include a series of sensors. One such sensor is fluid sensor 400, for example, a piezoelectric sensor that is used to determine the overall depth of the fluid present in utility vault 200. Fluid sensor 400 allows calculation of water depth or dielectric fluid depth or a combination of both water and dielectric fluid. Fluid sensor 400 is comprised of a transducer 410 that converts electrical signals into acoustical signal.

The transducer 410 of fluid sensor 400 may be mounted for example, on the bottom of fixed assembly 300 with the internal portion of fluid sensor 400 housed within fixed assembly 300. In such an orientation, transducer 410 sends and receives sound pulses reflected off any fluid accumulated within utility vault 200. The active component in transducer 410 may be a piezoelectric ceramic material. The ceramic material converts an electric transmit signal into a mechanical acoustic wave that travels through the air and reflects off of the bottom of the utility vault 200. When the acoustic wave strikes any fluid in utility vault 200, the signal is reflected back to the transducer and is converted back into an electric signal. By calculating the total travel time of the signal, the depth of any fluid present in utility vault 200 may be calculated. Any sensor type that detects the total depth or volume of fluid in a utility vault is usable in accordance with the invention. Suitable alternative sensor types include, sonar, thermal, pressure, and optical sensor configurations.

Assembly 300 may also contain additional sensors, used to gather other information about the conditions in utility vault 200. Typical sensors include a conduit temperature sensor 500, a cathodic protection sensor 550, and an ambient temperature sensor 700, although other sensors may be utilized depending on the conditions a user wishes to monitor.

Figure 5:
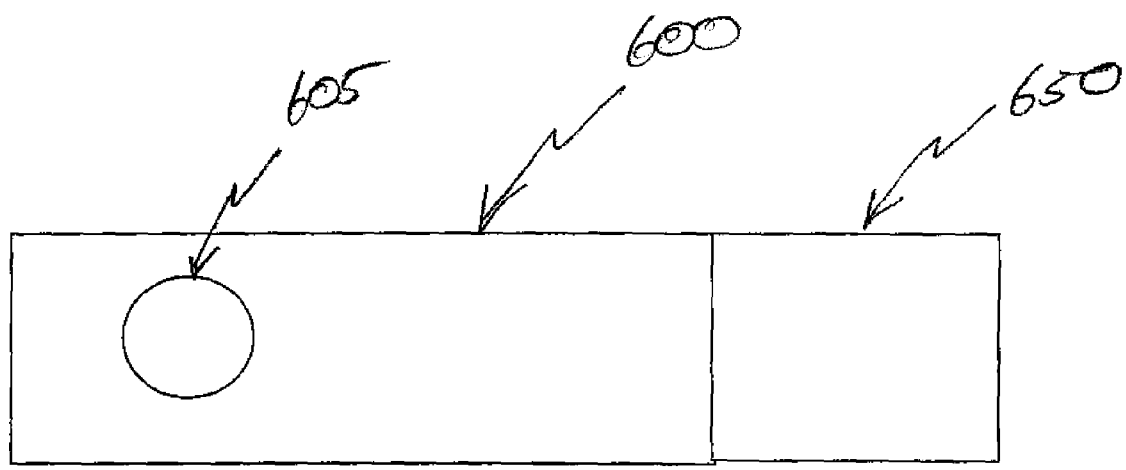
FIG. 5 shows a exemplary view of a sensor barge for use in accordance with the present invention.
Figure 5:
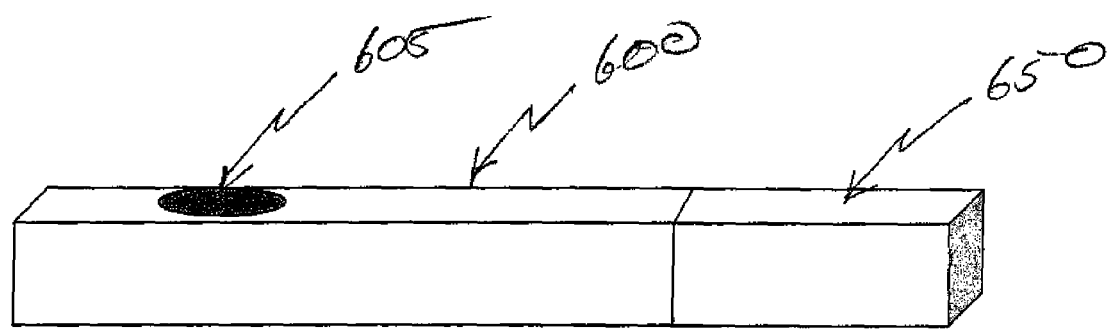

FIG. 5 depicts an exemplary configuration for sensor barge 600 of FIG. 2. In one configuration, sensor barge 600 is generally rectangular in shape having a length, width, and depth, although other shapes and geometries are possible. Cut out 605 allows sensor barge 600 to remain in proximity to sensor barge guide 640 as it rises and falls based on fluid level. It will be appreciated by those skilled in the art, that other shapes and configurations are usable in accordance with the invention without impacting the performance of the sensor, including designs that omit sensor guide 640.

In accordance with the invention, sensor barge 600 is advantageously designed having a specific gravity lighter then water and heavier then dielectric fluid. Because the specific gravity of sensor barge 600 is lighter then water, but heavier than dielectric fluid, the sensor barge will float in the presence of water and will sink in the presence of dielectric fluid. When there is a mixture of water and dielectric fluid, but not enough dielectric fluid to completely cover sensor barge 600, sensor barge 600 will float between the two. When the depth of dielectric fluid is greater than the thickness of sensor barge 600, sensor barge 600 will completely submerge below the surface of the water.

Air, water and dielectric fluid, all have different dielectric constants. Air for example has a dielectric constant of 1.0, while water has a dielectric constant of 80.0, and most dielectric fluids and dielectric fluids have a dielectric constant value around 2.1. Relying on these differences, an electrical circuit can distinguish between the types of fluids filling the spaces between parallel metallic plates 131 to 138 of sensor barge 600. An exemplary circuit configuration for use with sensor barge 600 is a series of parallel metallic plates 131 to 138. Metallic plates 131 to 138 form capacitors with a capacitive value that is dependent upon the dielectric constant of the material in between the parallel metallic plates 131 to 138. The parallel metallic plates 131 to 138 are connected via sensor umbilical cable 610 to oscillators 171 to 178. As is readily understood, other configurations are possible, oscillators 171 to 178 may be placed in the sensor barge 600, thereby locating them in closer proximity to the parallel metallic plates 131 to 138, and reducing capacitance generated by sensor umbilical cable 610. Depending on the type of fluid and the differences in dielectric constants of each fluid, between the metallic plates 131 to 138, a different resonant oscillation will be returned to microprocessor 310. Based on the particular capacitance and associated frequencies returned by the series of metallic plates 131 to 138, the circuit can determine if the sensor barge 600 is submerged in air, water, dielectric fluid or both. As is readily understood, other sensor circuits that can distinguish a first fluid from a second fluid may be utilized without departing from the invention, including for example wheatstone bridges.

An exemplary embodiment of the system will now be described with respect to FIGS. 2 and 4. A typical utility vault is 8 feet wide by 8 feet high by 17 feet long. Fixed assembly 300, housing, processor 310, batteries 320, transmitter 330 and interface circuit 340 is mounted to one of the side walls of utility vault 200. Fixed assembly 300 is positioned so that antenna 370 is located in close proximity to opening 150 and that transducer 410 is pointed in the downward direction toward the bottom of utility vault 200.

Sensor barge guide 640 is affixed between the top and bottom of utility vault 200, thereby allowing sensor barge 600 to ride along sensor barge guide 640 as the fluid level in utility vault 200 increases.

The system of an exemplary embodiment operates on battery power provided by batteries 320 located within fixed assembly 300, however, alternative power sources may be utilized as will be appreciated by one skilled in the art, including, other suitable AC or DC power sources or from power lines connected to the local utility company. Processor 310 controls the operation of the system and has the ability to enter a low power consumption state, thereby conserving energy and prolonging the operation of the system. In operation, processor 310 intermittently or periodically, e.g., once a day, transmits the current operating conditions within utility vault 200. In an exemplary embodiment, processor 310 is a single integrated circuit that includes time counter 311, a data formatter 312, and analog to digital converters 313. As may be appreciated by one skilled in the art, these components and functions may be included in a single IC chip or may be comprised of individual components or IC chips. Furthermore, as will be appreciated by one skilled in the art, these components may be housed within a single enclosure or multiple enclosures, or may even be mounted directly to utility vault 200 depending on the specific requirements of the space to be monitored.

Again, with respect to FIGS. 2 and 4, operation of the fluid monitoring apparatus and system will be described under the various fluid monitoring scenarios contemplated by the present invention, i.e., no fluid present in utility vault 200, water present in utility vault 200, dielectric fluid present in utility vault 200 and a combination or water and dielectric fluid present in utility vault 200.

No Fluid Present

When no water or dielectric fluid is present in utility vault 200 sensor 400 detects the total distance between the transducer 410 and the bottom of the utility vault 200 thereby indicating the absence of any appreciable amount of fluid. Likewise, because sensor barge 600 remains on the bottom of utility vault 200 there will be no fluid between the parallel metallic plates 131 to 138. Accordingly, there will be no dielectric fluid or water detected and no information relative to fluid to report.

Nonetheless, the system may gather other information such as conduit temperature via sensor 500, ambient temperature via sensor 700, and cathodic protection via sensor 550. This information is then conveyed via interface circuit 340 to processor 310. The data may be stored in comma delimited files, or any other suitable format. At intermittent intervals, such as periodically, e.g., once a day, processor 310 transitions from a standby state and conveys the stored information to wireless transmitter 330. Wireless transmitter 330, transmits the information via antenna 370 to a transceiver equipped personal computer at a remote location. Wireless transmission may be carried out in a variety of formats such as GSM or CDMA, although GSM is preferred. Additionally, as will be understood by one skilled in the art, modes of data transmission other than wireless may be used to transmit the data. Some exemplary modes include use of telephone lines, fiber optic transmission lines, cable television transmission lines data network links, or any other suitable form of communication line.

Water Only Present

Sensor 400 will detect the presence of fluid in utility vault 200 without making a determination of the presence of multiple fluids or the type of fluid. Transceiver 410 will transmit its acoustical signal towards the bottom of utility vault 200 and the signal will be reflected back to transceiver 410 in a shorter period of time then when there is no fluid present, thereby indicating the presence of fluid in utility vault 200. Sensor 400 outputs a respective signal indicating a change in the depth of fluid without any indication as to the type and number of fluids present.

Due to the specific gravity of sensor barge 600 it will float on top of water. Because sensor barge 600 floats on water the metallic plates 131 to 138 will not contact the water and no fluid will fill the gaps in metallic plates 131 to 138. Based on the dielectric constant of 1.0 for air, the oscillators 171 to 178 will generate a signal at a particular frequency, i.e., a frequency previously associated with the dielectric constant for air. The signals from the respective oscillators, 171-178 are transmitted to multiplexer 618 and combined into a single multiplexed signal. The combined signal is transmitted to microprocessor 310 which de-multiplexes the signal and determines which if, any of the metallic plates 171 to 178 are in the presence of air, water or dielectric fluid. The gathered information may then be stored, collected, formatted, and/or transmitted in a like manner as described above. It is readily understood that the oscillator signals may be communicated without multiplexing in accordance with the invention. Moreover, alternative sensor material are usable for detecting a difference in other characteristics of two or more fluids that may be present in the utility vault 200, including, for example, sensors to measure the pH or specific gravity or conductivity of a particular fluid to determine the fluids presence and composition.

Dielectric Fluid Only

With reference to FIGS. 2 and 4, and as with the detection of water only, when there is only dielectric fluid present in utility vault 200, sensor 400 directs an acoustical signal toward the bottom of utility vault 200. The signal is reflected back to transceiver 410 in a shorter period of time than when there is no fluid present, thereby indicating the presence of fluid in utility vault 200. Sensor 400 will output a respective signal to processor 310 indicating a change in the overall depth of fluid. Sensor barge 600 will remain in close proximity to sensor barge guide 640 but due to the specific gravity of sensor barge 600, it will not float on the dielectric. Because sensor barge 600 does not float on dielectric fluid, the metallic plates 131 to 138 will directly contact the dielectric fluid depending on the depth of fluid present. Based on the depth of the dielectric fluid, some or all of the gaps between metallic plates 131 to 138 will be filled with dielectric fluid. Based on the dielectric constant of 2.1 for dielectric fluid, the oscillators 171 to 178 will generate signals at a particular frequency, i.e., a frequency previously associated with the dielectric constant for dielectric fluid. The respective oscillator signals from oscillators 171 to 178 will be multiplexed together in multiplexer 618 and the combined signal will be conveyed to microprocessor 310. Microprocessor 310 will determine which, if any of the metallic plates are submerged in dielectric fluid and which are in air. The information will then be collected, stored, formatted, and/or transmitted in a like manner as described above. As with the detection of water only, it will be appreciated that alternative sensors and detection circuits may be utilized without departing from the spirit of the invention, furthermore, as noted above, it is readily understood that the oscillator signals may be communicated without multiplexing in accordance with the invention. For example, a sensor circuit could be incorporated into sensor barge guide 640 or sensor barge 600 might be equipped to detect a fluids property other than dielectric constant.

Both Water and Dielectric Fluid Present

When both water and dielectric fluid are present, sensor barge 600, due to its specific gravity, will either float between the two fluids, or be submerged in the water depending on the amount of dielectric fluid present.

When there is both water and dielectric fluid present in utility vault 200, sensor 400 transmits its acoustical signal which in turn is reflected back to transceiver 410 in a shorter period of time then when there is no fluid present, thereby indicating the presence of fluid in utility vault 200. Sensor 400 will output a respective signal indicating a change in the depth of fluid. Sensor barge 600 will remain in close proximity to sensor barge guide 640 and will rise in the water and dielectric fluid.

When the depth of the dielectric fluid does not exceed the height of sensor barge 600, sensor barge 600 will float between the two fluids. As a result, some of the metallic plates 131 to 138 may be submerged in water and some in dielectric fluid and others still in air. In this configuration, the oscillators 171 to 178 will resonate at different frequencies depending on which fluid their respective metallic plates are submerged in, i.e., air, water, or dielectric fluid. This frequency information of oscillators 171 to 178 may be multiplexed together in multiplexer 618 and conveyed to microprocessor 310, which will determine if the particular metallic plate are in water, dielectric fluid, or air. The microprocessor 310, then formats the data and stores it for later transmission to the central location for further processing via wireless transmitter 330. Alternatively, the microprocessor 310, may be preprogrammed, based on the number of metallic plates in water and the number in dielectric fluid, and the number in air, to output information directly relating to the amount of dielectric fluid present.

Additionally, because acoustic sensor 400 can determine the overall depth of the fluid, present in the utility vault 200, microprocessor 310 may perform the necessary calculations to determine the amount of water and the amount of dielectric fluid present. This information can then be transmitted via wireless transmitter 330 to the central location. Based on inherent properties of the sensor barge 600, and the geometry of the metallic plates 131 to 138 located in sensor barge 600, the microprocessor can make very accurate determinations as to the amount of dielectric fluid present.

In the case where the depth of the dielectric fluid exceeds the depth of the sensor barge 600, The specific gravity of sensor barge 600 is specifically chosen to be lighter than water, and heavier than dielectric fluid. As a result, when the depth of dielectric fluid exceeds the height of the sensor barge 600, the sensor barge 600 will completely submerge in the water. In such instances, the gaps in metallic plates 131 to 138 will all be filled with water causing the respective oscillators to resonate at a particular frequency previously associated with the presence of water. The information from the respective oscillators 171 to 178 is multiplexed together via multiplexer 618 and conveyed to microprocessor 310. Microprocessor 310 may then transmit this information via wireless transmitter 330 to the central location It will be appreciated, that alternative sensor configurations may be implemented, that include, for example, sensors located at the bottom of utility vault 200 that can determine the depth between the bottom of the utility vault 200 and barge 600, thereby measuring the level of water preset. Once the amount of water present is known, the amount of dielectric fluid can be computed based on the total amount of fluid present. Furthermore, various sensor barge configurations might be implemented to allow for more specific measurements. One such configuration might include a sensor barge that is thicker then the anticipated depth of the maximum expected dielectric fluid, a barge will never be completely submerged, thereby always indicating the exact amount of dielectric fluid present. Another configuration might include a vertical sensor configuration that continues for the entire height of the utility vault 200, thereby including many more metallic plate pairs to allow for greater fluid depth measurements. While the foregoing description and drawings represent an embodiment of the present invention, it will be understood that various changes and modifications may be made without departing from the scope and sprit of the present invention. For example, alternative useful sensor configurations include any first sensor that identifies the total depth of the fluids present and a second sensor that detects a characteristic of a particular fluid that makes determination of the depth of the second fluid present possible.

What is claimed is:

1. A liquid monitoring apparatus comprising:
a first sensor for detecting a depth of total liquid in an enclosed space; said total liquid comprising at least a first type of liquid; and a second sensor comprises a plurality of parallel metallic plates for detecting the presence of a second type of liquid in the enclosed space and a depth of such second type of liquid up to a threshold depth, wherein the first and second types of liquids make up at least a portion of the depth of total liquid and have different specific gravities, wherein said second sensor is disposed within a barge capable of floating within said first type of liquid but not said second type of liquid, wherein the first sensor is a sonar, pressure, optical or thermal device located above and not in contact with the total liquid and the second sensor contacts either the first type of liquid, the second type of liquid or the total liquid.

2. The apparatus of claim 1 further comprising a plurality of oscillators coupled to respective ones of the parallel metallic plates to form an a-stable multi-vibrator.

3. The apparatus of claim 1 further comprising:
a processor coupled to a wireless transmitter;
and a power source,
wherein the processor is capable of receiving signals from said first and second sensors.

4. The apparatus of claim 3 further comprising at least an additional sensor capable of providing signals to said processor.

5. The apparatus of claim 4 wherein the additional sensor is selected from the group consisting of an ambient temperature sensor, a conduit temperature sensor, a stray voltage sensor, or a cathodic voltage sensor.

6. The apparatus of claim 1 wherein the property detected by the second sensor is a dielectric constant of the second type of liquid.

7. The apparatus of claim 1 wherein said enclosure is a utility vault.

8. The apparatus of claim 1 wherein the first and second types of liquid have different dielectric constants and the second sensor detects a dielectric constant.

* * * * *